United States Patent
Yuzawa (10) Patent No.: US 12,518,393 B2
(45) Date of Patent: Jan. 6, 2026

(54) REGION CORRECTION DEVICE, METHOD, AND PROGRAM

(71) Applicant: FUJIFILM Corporation, Tokyo (JP)

(72) Inventor: Takuya Yuzawa, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 449 days.

(21) Appl. No.: 18/066,250

(22) Filed: Dec. 14, 2022

(65) Prior Publication Data

US 2023/0113725 A1 Apr. 13, 2023

Related U.S. Application Data

(63) Continuation of application No. PCT/JP2021/016766, filed on Apr. 27, 2021.

(30) Foreign Application Priority Data

Jun. 18, 2020 (JP) ................................ 2020-105460

(51) Int. Cl.
*G06T 7/11* (2017.01)
*A61B 6/00* (2006.01)

(52) U.S. Cl.
CPC .............. *G06T 7/11* (2017.01); *A61B 6/5211* (2013.01); *A61B 6/5258* (2013.01);
(Continued)

(58) Field of Classification Search
None
See application file for complete search history.

(56) References Cited

U.S. PATENT DOCUMENTS 7,388,973 B2 * 6/2008 Fidrich ................ G06T 7/12
382/128
7,466,872 B2 * 12/2008 Oh ....................... G06T 7/12
382/256
(Continued)

FOREIGN PATENT DOCUMENTS

JP H11272865 10/1999
JP 2005028051 2/2005
(Continued)

OTHER PUBLICATIONS

"International Search Report (Form PCT/ISA/210) of PCT/JP2021/016766," mailed on Jul. 20, 2021, with English translation thereof, pp. 1-7.
(Continued)

*Primary Examiner* — Tsung Yin Tsai
(74) *Attorney, Agent, or Firm* — JCIPRNET (57) ABSTRACT

A region correction device, method, and program make it possible to, when one of a plurality of regions is corrected to be reduced, determine the boundaries of a plurality of regions adjacent to the reduced region. A processor reduces a first region among a plurality of regions in response to an instruction to reduce the first region, the instruction being provided for a target image in which the plurality of regions are adjacent to each other, the plurality of regions being three or more regions different from each other. The processor derives a difference region representing a difference between the first region before reduction and the first region after reduction, the difference region being composed of a plurality of small regions. The processor assigns a plurality of adjacent regions adjacent to the first region to the difference region by sequentially expanding, in the difference region, the plurality of adjacent regions in units of the small
(Continued)

regions from a boundary between the difference region and the plurality of adjacent regions.

11 Claims, 8 Drawing Sheets

(52) U.S. Cl.
CPC .............................. *G06T 2200/04* (2013.01); *G06T 2207/10081* (2013.01); *G06T 2207/20081* (2013.01); *G06T 2207/20084* (2013.01); *G06T 2207/30004* (2013.01)

(56) References Cited

U.S. PATENT DOCUMENTS

| | | | |
|---|---|---|---|
| 8,649,599 B2* | 2/2014 | Yamada | G06T 7/143 |
| | | | 382/173 |
| 10,339,648 B2* | 7/2019 | Stringfield | G06T 5/50 |
| 2005/0078857 A1* | 4/2005 | Park | G06T 7/12 |
| | | | 382/128 |
| 2008/0170768 A1 | 7/2008 | Matsumoto | |
| 2011/0286672 A1 | 11/2011 | Yamanaka | |
| 2012/0114240 A1* | 5/2012 | Yamada | G06T 7/194 |
| | | | 382/173 |
| 2014/0193054 A1* | 7/2014 | Blaffert | G06T 7/11 |
| | | | 382/131 |
| 2015/0254842 A1* | 9/2015 | Brown | G06T 7/187 |
| | | | 382/131 |
| 2015/0260814 A1 | 9/2015 | Sakurai et al. | |
| 2015/0356730 A1* | 12/2015 | Grove | G06T 7/64 |
| | | | 382/124 |
| 2015/0366500 A1 | 12/2015 | Aoyagi et al. | |
| 2016/0267305 A1* | 9/2016 | Lei | G06K 7/10584 |
| 2016/0284084 A1* | 9/2016 | Gurcan | G16H 30/40 |
| 2018/0000441 A1 | 1/2018 | Wang et al. | |
| 2018/0315506 A1* | 11/2018 | Mukhopadhyay | G16H 50/20 |
| 2020/0281449 A1* | 9/2020 | Yoshimura | A61B 90/361 |
| 2022/0198674 A1* | 6/2022 | Choi | G06T 7/12 |
| 2022/0233159 A1* | 7/2022 | Yoon | G06T 7/12 |
| 2023/0052133 A1* | 2/2023 | Wang | G06T 7/149 |
| 2023/0113725 A1* | 4/2023 | Yuzawa | A61B 6/032 |
| | | | 382/173 |
| 2024/0303832 A1* | 9/2024 | Chen | G06T 7/215 |

FOREIGN PATENT DOCUMENTS

| | | |
|---|---|---|
| JP | 2008173167 | 7/2008 |
| JP | 2011244205 | 12/2011 |
| JP | 2012045256 | 3/2012 |
| JP | 2014121598 | 7/2014 |
| JP | 2015528372 | 9/2015 |
| JP | 2016007270 | 1/2016 |
| JP | 2016067280 | 5/2016 |

OTHER PUBLICATIONS

"Written Opinion of the International Searching Authority (Form PCT/ISA/237) of PCT/JP2021/016766," mailed on Jul. 20, 2021, with English translation thereof, pp. 1-6.

* cited by examiner

REGION CORRECTION DEVICE, METHOD, AND PROGRAM

CROSS REFERENCE TO RELATED APPLICATIONS

The present application is a Continuation of PCT International Application No. PCT/JP2021/016766, filed on Apr. 27, 2021, which claims priority to Japanese Patent Application No. 2020-105460, filed on Jun. 18, 2020. Each application above is hereby expressly incorporated by reference, in its entirety, into the present application.

BACKGROUND

Technical Field

The present disclosure relates to a region correction device, method, and program for correcting a plurality of regions included in an image.

Related Art

In recent years, the progress of medical devices, such as computed tomography (CT) devices and magnetic resonance imaging (MRI) devices, has made it possible to perform image diagnosis using a high-resolution three-dimensional image having higher quality. It has also been performed that a region of interest, such as an organ and a lesion, included in such a three-dimensional image is automatically extracted. However, in a case where a region of interest is automatically extracted, over-extraction and under-extraction may occur. In such a case, it is necessary to correct the boundary of the automatically extracted region of interest.

An existing method of correcting a boundary is a method of displaying a two-dimensional tomographic image constituting a three-dimensional image, and moving a cursor having a predetermined shape such as a circle in the displayed tomographic image, thereby deleting an over-extracted portion in a region of interest or compensating for an under-extracted portion. However, in a case where a cursor is used and where the shape of a region of interest is complicated, it may be impossible to perform correction intended by an operator. For this reason, a region of interest may be corrected by designating a region in a freehand manner. For example, there has been proposed a method of accepting correction of a boundary surface of a region of interest in a three-dimensional image to correct the boundary surface (see, for example, JP2012-045256A). There has also been proposed a method of correcting a boundary line of a region of interest to correct the region of interest (see, for example, JP2005-028051A).

On the other hand, there is a case in which a plurality of three or more regions of interest different from each other are adjacent to each other in an image. In such a case, if one of the plurality of regions of interest is corrected to be reduced, the other regions adjacent to the corrected region are enlarged. However, it is difficult to uniquely determine the boundaries of the other enlarged regions.

SUMMARY OF THE INVENTION

The present disclosure has been made in view of the above circumstances, and an object of the present disclosure is to, when one of a plurality of regions is corrected to be reduced, determine the boundaries of a plurality of regions adjacent to the reduced region.

A region correction device according to the present disclosure includes at least one processor configured to:
reduce a first region among a plurality of regions in response to an instruction to reduce the first region, the instruction being provided for a target image in which the plurality of regions are adjacent to each other, the plurality of regions being three or more regions different from each other;
derive a difference region representing a difference between the first region before reduction and the first region after reduction, the difference region being composed of a plurality of small regions; and
assign a plurality of adjacent regions adjacent to the first region to the difference region by sequentially expanding, in the difference region, the plurality of adjacent regions in units of the small regions from a boundary between the difference region and the plurality of adjacent regions.

In the region correction device according to the present disclosure, the processor may be configured to repeat expansion of the plurality of adjacent regions until the difference region has no more unassigned regions left.

In the region correction device according to the present disclosure, the processor may be configured to derive, for unassigned small regions adjacent to assigned small regions to which the plurality of adjacent regions are assigned in the difference region, distances from the assigned small regions for each of the adjacent regions, and sequentially assign the adjacent regions to small regions having a smallest distance for each of the adjacent regions, to expand the adjacent regions.

In the region correction device according to the present disclosure, the processor may be further configured to extract the plurality of regions from the target image.

A region correction method according to the present disclosure includes: reducing a first region among a plurality of regions in response to an instruction to reduce the first region, the instruction being provided for a target image in which the plurality of regions are adjacent to each other, the plurality of regions being three or more regions different from each other;
deriving a difference region representing a difference between the first region before reduction and the first region after reduction, the difference region being composed of a plurality of small regions; and
assigning a plurality of adjacent regions adjacent to the first region to the difference region by sequentially expanding, in the difference region, the plurality of adjacent regions in units of the small regions from a boundary between the difference region and the plurality of adjacent regions.

A program for causing a computer to execute the region correction method according to the present disclosure may be provided.

According to the present disclosure, when one of a plurality of regions is corrected to be reduced, the boundaries of a plurality of regions adjacent to the reduced region can be determined.

DETAILED DESCRIPTION

Figure 1:
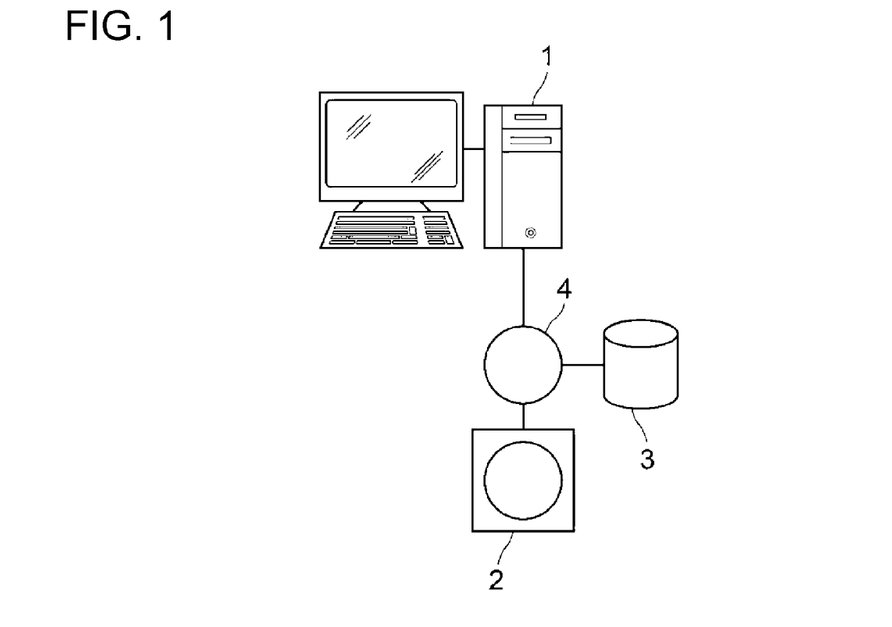
FIG. 1 is a diagram illustrating a schematic configuration of a medical information system to which a region correction device according to an embodiment of the present disclosure is applied.

Hereinafter, an embodiment of the present disclosure will be described with reference to the drawings. First, a description will be given of the configuration of a medical information system to which a region correction device according to the present embodiment is applied. FIG. 1 is a diagram illustrating a schematic configuration of a medical information system. In the medical information system illustrated in FIG. 1, a computer 1 including the region correction device according to the present embodiment, an imaging device 2, and an image storage server 3 are connected to each other so as to be capable of communicating with each other via a network 4.

The computer 1 includes the region correction device according to the present embodiment, and has a region correction program according to the present embodiment installed therein. The computer 1 may be a work station or a personal computer directly operated by a doctor who performs diagnosis, or may be a server computer connected to the work station or the personal computer via a network. The region correction program is stored in a storage device of a server computer connected to a network or a network storage so as to be accessible from the outside, and is downloaded and installed into the computer 1 used by the doctor in response to a request. Alternatively, the region correction program may be recorded on a recording medium, such as a digital versatile disc (DVD) or a compact disc read only memory (CD-ROM), distributed, and installed into the computer 1 from the recording medium.

The imaging device 2 is a device that images a portion to be diagnosed of a subject to generate a three-dimensional image representing the portion, and is specifically a CT device, an MRI device, a positron emission tomography (PET) device, or the like. The three-dimensional image generated by the imaging device 2 and composed of a plurality of slice images is transmitted to and stored in the image storage server 3.

The image storage server 3 is a computer that stores and manages various data, and includes a large-capacity external storage device and database management software. The image storage server 3 communicates with another device in a wired manner or in a wireless manner using the network 4 to transmit and receive image data and the like. Specifically, the image storage server 3 acquires various data including image data of a three-dimensional image generated by the imaging device 2 via a network, stores the various data in a recording medium such as the large-capacity external storage device, and manages the various data. The storage format of the image data and the communication between the individual devices via the network 4 are based on a protocol such as Digital Imaging and Communication in Medicine (DICOM).

Figure 2:
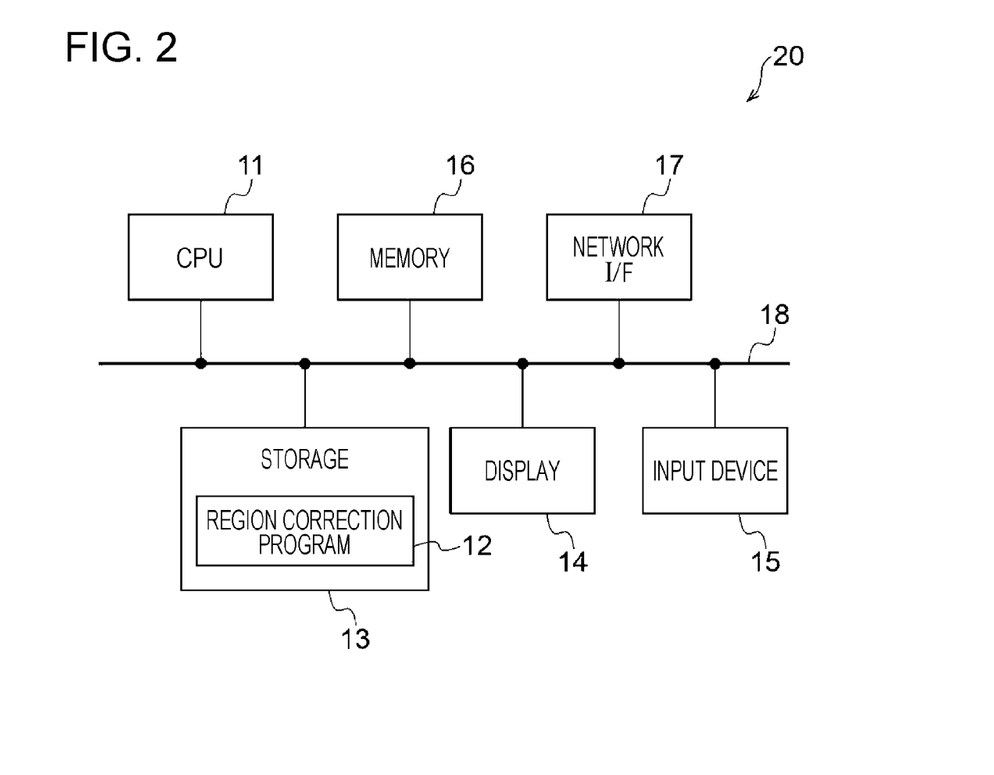
FIG. 2 is a diagram illustrating a schematic configuration of the region correction device according to the present embodiment.

Next, the region correction device according to the present embodiment will be described. FIG. 2 illustrates the hardware configuration of the region correction device according to the present embodiment. As illustrated in FIG. 2, a region correction device 20 includes a central processing unit (CPU) 11, a nonvolatile storage 13, and a memory 16 serving as a temporary storage area. The region correction device 20 also includes a display 14 such as a liquid crystal display, an input device 15 such as a keyboard and a mouse, and a network interface (I/F) 17 connected to the network 4. The CPU 11, the storage 13, the display 14, the input device 15, the memory 16, and the network I/F 17 are connected to a bus 18. The CPU 11 is an example of a processor in the present disclosure.

The storage 13 is implemented by a hard disk drive (HDD), a solid state drive (SSD), a flash memory, or the like. The storage 13 serving as a storage medium stores a region correction program 12. The CPU 11 reads out the region correction program 12 from the storage 13, loads the region correction program 12 into the memory 16, and executes the loaded region correction program 12.

Figure 3:
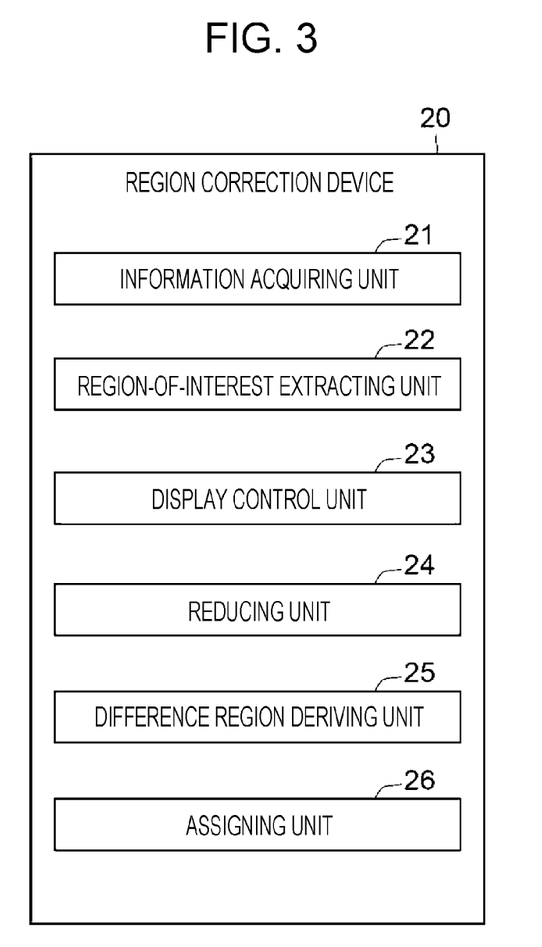
FIG. 3 is a functional configuration diagram of the region correction device according to the present embodiment.

Next, the functional configuration of the region correction device according to the present embodiment will be described. FIG. 3 is a diagram illustrating the functional configuration of the region correction device according to the present embodiment. As illustrated in FIG. 3, the region correction device 20 includes an information acquiring unit 21, a region-of-interest extracting unit 22, a display control unit 23, a reducing unit 24, a difference region deriving unit 25, and an assigning unit 26. The CPU 11 executes the region correction program 12, and thereby the CPU 11 functions as the information acquiring unit 21, the region-of-interest extracting unit 22, the display control unit 23, the reducing unit 24, the difference region deriving unit 25, and the assigning unit 26.

The information acquiring unit 21 acquires a three-dimensional image G0 from the image storage server 3 via the network I/F 17, in response to an instruction provided from an operator via the input device 15. The three-dimensional image G0 is composed of a plurality of tomographic images Dj (j=1 to n, n is the number of tomographic images). The three-dimensional image G0 includes, for example, a region of interest of an organ to which the user pays attention, a specific region in an organ, or a structure such as a bone and cartilage, which are targets of diagnosis. In a case where the three-dimensional image G0 is already stored in the storage 13, the information acquiring unit 21 may acquire the three-dimensional image G0 from the storage 13.

The region-of-interest extracting unit 22 extracts three or more regions of interest from the three-dimensional image G0. For this purpose, the region-of-interest extracting unit 22 includes a trained model that has been subjected to machine learning so as to extract regions of interest from the three-dimensional image G0. The trained model is constituted by a neural network that has been subjected to deep learning so as to extract an organ to be diagnosed, a specific region in an organ, or a structure such as a bone and cartilage, as regions of interest. Examples of an organ as a target to be diagnosed include a heart, a liver, a lung, a kidney, and a brain. In the present embodiment, the three-dimensional image G0 is a CT image of a head including a brain, and the regions of interest are three or more regions in the brain. In response to input of the three-dimensional image G0, the trained model outputs a determination result indicating whether each of the pixels of the three-dimensional image G0 is included in a region of interest. The region-of-interest extracting unit 22 extracts, as a region of interest, a region composed of pixels determined to be included in the region of interest.

The trained model may be constituted by, for example, a support vector machine (SVM), a convolutional neural network (CNN), a recurrent neural network (RNN), or the like, instead of a neural network that has been subjected to deep learning. In addition, the region-of-interest extracting unit 22 is not limited to a unit including a trained model that has been subjected to machine learning. For example, the region-of-interest extracting unit 22 may extract a region of interest by template matching, threshold processing, and so forth.

The display control unit 23 displays the three-dimensional image G0 from which the regions of interest have been extracted on the display 14.

Figure 4:
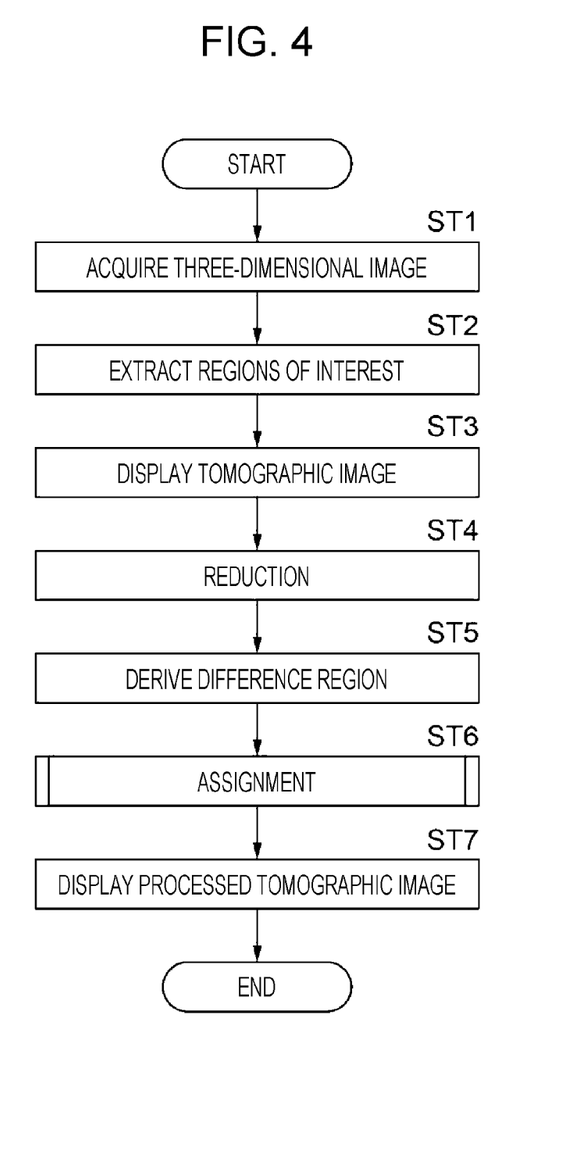
FIG. 4 is a flowchart illustrating a process performed in the present embodiment.

Hereinafter, a process performed by the reducing unit 24, the difference region deriving unit 25, and the assigning unit 26 will be described together with a process performed by the information acquiring unit 21, the region-of-interest extracting unit 22, and the display control unit 23. FIG. 4 is a flowchart illustrating a process performed in the present embodiment. First, the information acquiring unit 21 acquires a three-dimensional image G0 (step ST1). Subsequently, the region-of-interest extracting unit 22 extracts three or more regions of interest from the three-dimensional image G0 (step ST2). Subsequently, the display control unit 23 displays, on the display 14, a tomographic image Dk as a target of region correction among a plurality of tomographic images Dj constituting the three-dimensional image G0 (step ST3). The tomographic image Dk that is displayed may be a tomographic image of any of an axial cross section, a sagittal cross section, and a coronal cross section.

Figure 5:
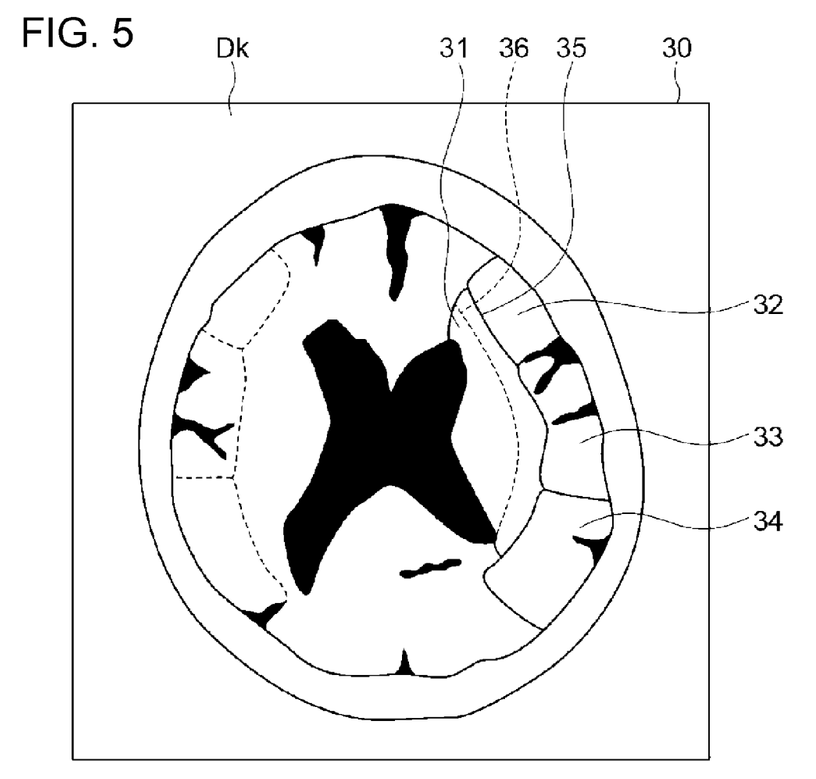
FIG. 5 is a diagram illustrating a display screen of a tomographic image.

FIG. 5 is a diagram illustrating a display screen of the tomographic image Dk. The tomographic image Dk illustrated in FIG. 5 shows a brain viewed from the lower side of a human body. As illustrated in FIG. 5, the tomographic image Dk included in a display screen 30 is an image of an axial cross section of the head of a human body, and four regions of interest 31 to 34 are extracted. The region of interest 31 and the regions of interest 32 to 34 are in contact with each other at a boundary 35. The regions of interest 31 to 34 are included in the tomographic image Dk as a mask. As illustrated in FIG. 5, the mask may represent only the boundary 35 of the regions of interest 31 to 34, or may apply different hatching patterns to the individual regions of interest 31 to 34, or may apply different colors to the individual regions of interest 31 to 34.

Here, the result of extraction of the regions of interest by the region-of-interest extracting unit 22 is not necessarily accurate, and may be different from the actual regions of interest included in the tomographic image Dk. For example, regarding the region of interest 31, the boundary 35 between the region of interest 31 and the regions of interest 32 to 34 may actually be a boundary indicated by a broken line 36. In such a case, it is necessary to reduce the region of interest 31 so that the boundary 35 between the region of interest 31 and the regions of interest 32 to 34 coincides with the boundary indicated by the broken line 36.

For this purpose, the user provides, using the input device 15, an instruction to correct the boundary 35 between the region of interest 31 and the regions of interest 32 to 34 to the boundary indicated by the broken line 36. Specifically, the user provides, using a mouse cursor or a touch pen, an instruction to correct the boundary 35 of the region of interest 31 to the boundary indicated by the broken line 36. The reducing unit 24 reduces the region of interest 31 in response to an instruction to reduce the region of interest 31 (step ST4). The region of interest 31 corresponds to a first region of the present disclosure, and the regions of interest 32 to 34 correspond to adjacent regions of the present disclosure. Thus, in the following description, the regions of interest 32 to 34 may be referred to as adjacent regions 32 to 34. Subsequently, the difference region deriving unit 25 derives a difference region representing a difference between the region of interest 31 before reduction and the region of interest after reduction (step ST5).

Figure 6:
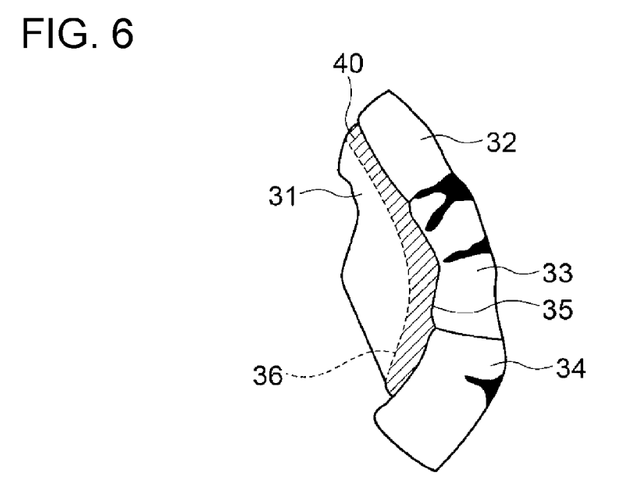
FIG. 6 is a diagram for describing derivation of a difference region.

FIG. 6 is a diagram for describing derivation of a difference region. As illustrated in FIG. 6, the difference region deriving unit 25 derives a difference region 40 representing a difference between the region of interest 31 before reduction and the region of interest after reduction. In FIG. 6, the difference region 40 is hatched. The difference region 40 is composed of a plurality of pixels included in the tomographic image Dk. Each of the pixels in the difference region 40 corresponds to a small region of the present disclosure. That is, one pixel in the difference region 40 constitutes one small region.

Here, the three adjacent regions 32 to 34 are adjacent to the region of interest 31 before reduction. In a case where the region of interest 31 is reduced in the above-described manner, the difference region 40 is derived, but the boundaries of the three adjacent regions 32 to 34 are not defined in the difference region 40. Thus, in the present embodiment, the assigning unit 26 expands the adjacent regions 32 to 34 on a pixel-by-pixel basis from the boundary 35, thereby assigning the adjacent regions 32 to 34 to the difference region 40 (step ST6). Specifically, the assigning unit 26 derives, for unassigned pixels in an unassigned region adjacent to assigned pixels to which the plurality of adjacent regions 32 to 34 are assigned in the difference region 40, distances from assigned pixels for each of the adjacent regions 32 to 34, and sequentially assigns the adjacent regions 32 to 34 to the unassigned pixels having the smallest distance for each of the adjacent regions 32 to 34. In the present embodiment, the assigned pixels include the pixels of the adjacent regions 32 to 34 extracted by the region-of-interest extracting unit 22.

Figure 7:
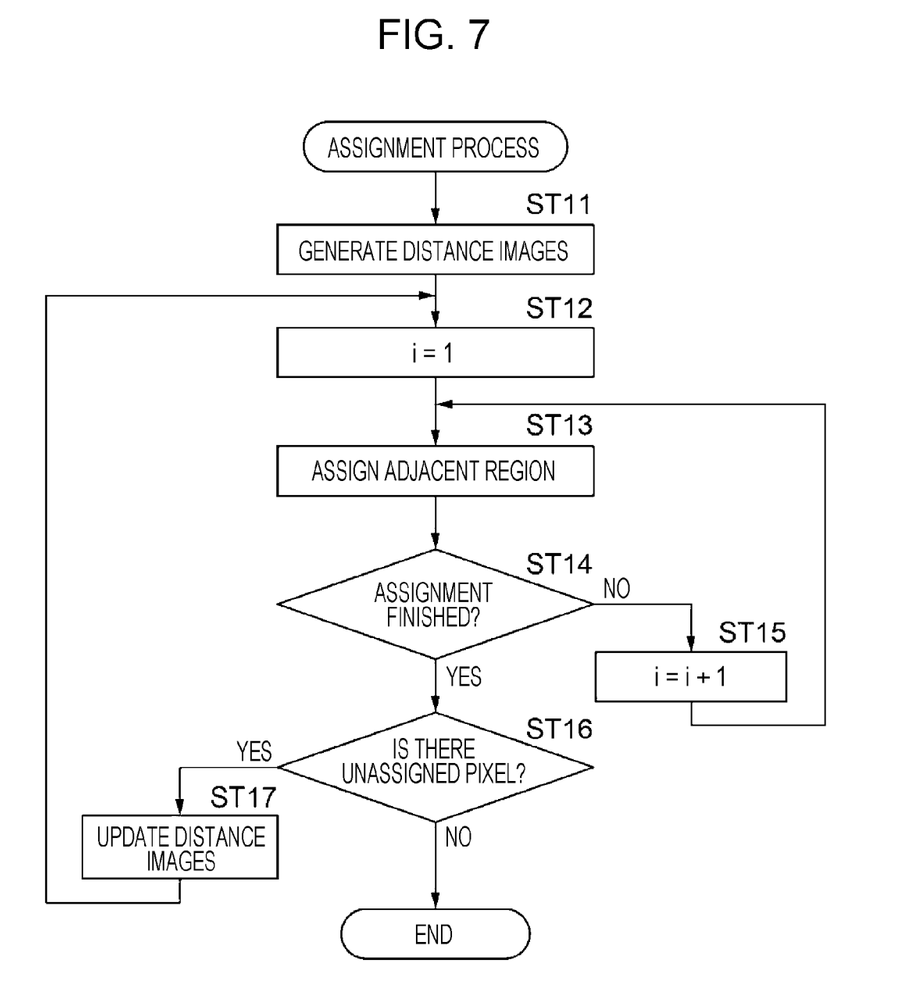
FIG. 7 is a flowchart illustrating an assignment process.
Figure 8:
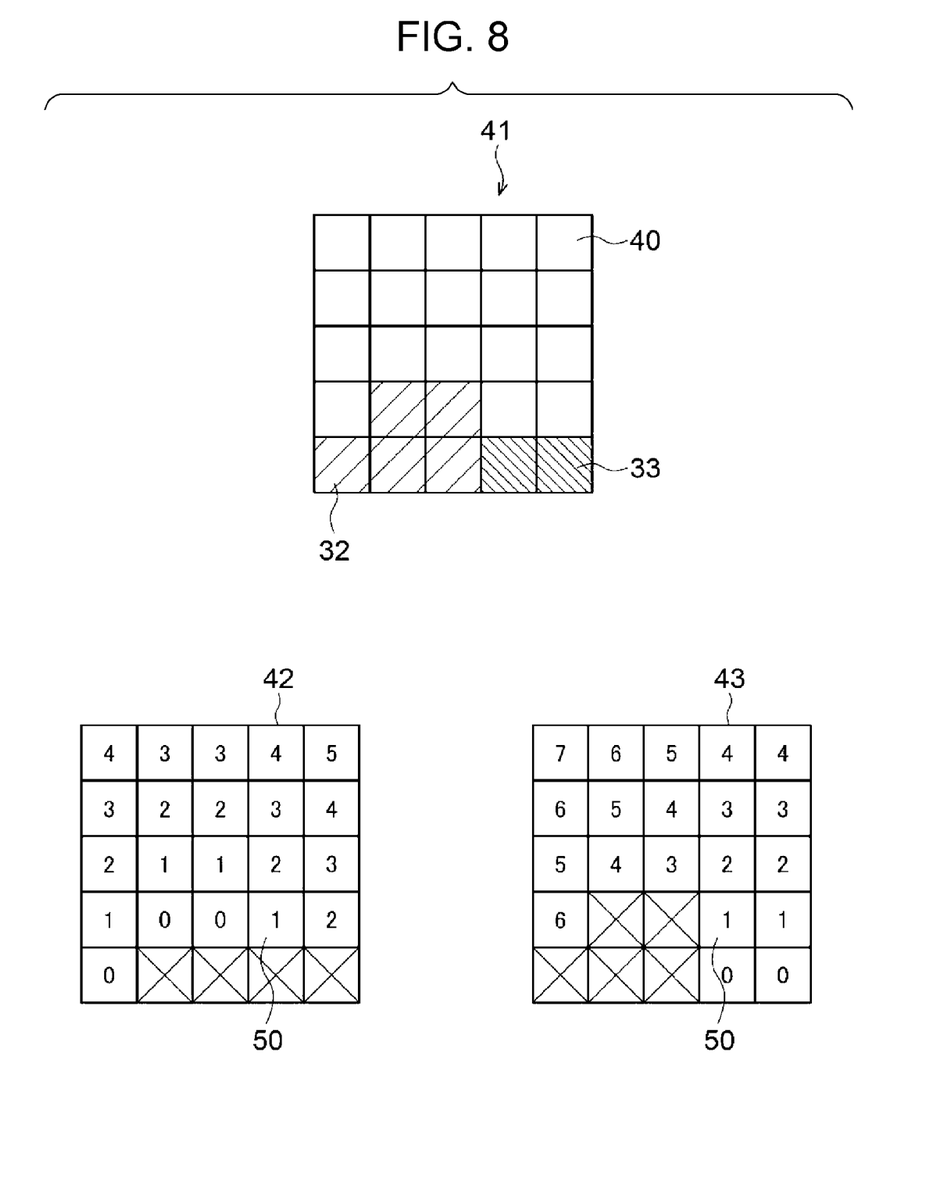
FIG. 8 is a diagram for describing derivation of distance images.

FIG. 7 is a flowchart illustrating a process performed by the assigning unit 26. First, the assigning unit 26 generates, for the difference region 40, distance images for the individual adjacent regions 32 to 34 (step ST11). FIG. 8 is a diagram for describing generation of distance images. To simplify the description, FIG. 8 illustrates generation of distance images using a region of 5×5 pixels (hereinafter referred to as a process region) 41 including a boundary where the difference region 40 is adjacent to the two adjacent regions 32 and 33. As illustrated in FIG. 8, the process region 41 includes the difference region 40 that is not hatched, the adjacent region 32 having first hatching extending from the lower left toward the upper right, and the adjacent region 33 having second hatching extending from the lower right toward the upper left.

The assigning unit 26 generates, in the difference region 40 in the process region 41, a distance image 42 for the adjacent region 32 and a distance image 43 for the adjacent region 33. The distance images are obtained by assigning, to unassigned pixels in the difference region 40, the shortest distances from respective adjacent pixels adjacent to the difference region 40 in the adjacent region 32 and the adjacent region 33. In the present embodiment, the shortest distance is the smallest number of pixels from the adjacent pixel to the unassigned pixel. For the pixel to which the adjacent region 32 or 33 is already assigned, a distance is not derived. Thus, in FIG. 8, a cross mark is given to the pixel for which a distance is not to be derived in the distance images 42 and 43.

Subsequently, the assigning unit 26 sets the adjacent region to be assigned to the first adjacent region (step ST12; i=1). Note that i is a label given to the adjacent regions 32 to 34. In the present embodiment, labels 1 to 3 are given to the adjacent regions 32 to 34, respectively. For the adjacent region having the i-th label (the first label when i=1), the assigning unit 26 refers to the distance image, and assigns the i-th adjacent region to the pixels of the shortest distance (i.e., 1) among unassigned pixels adjacent to assigned pixels to which the adjacent region is assigned (step ST13; assign adjacent region). The assigning unit 26 then determines whether assignment has been finished for all the adjacent regions (step ST14). If a negative determination is made in step ST14, the assigning unit 26 updates the adjacent region to be assigned (i=i+1; step ST15), returns to step ST13, and repeats the process from step ST13.

Figure 9:
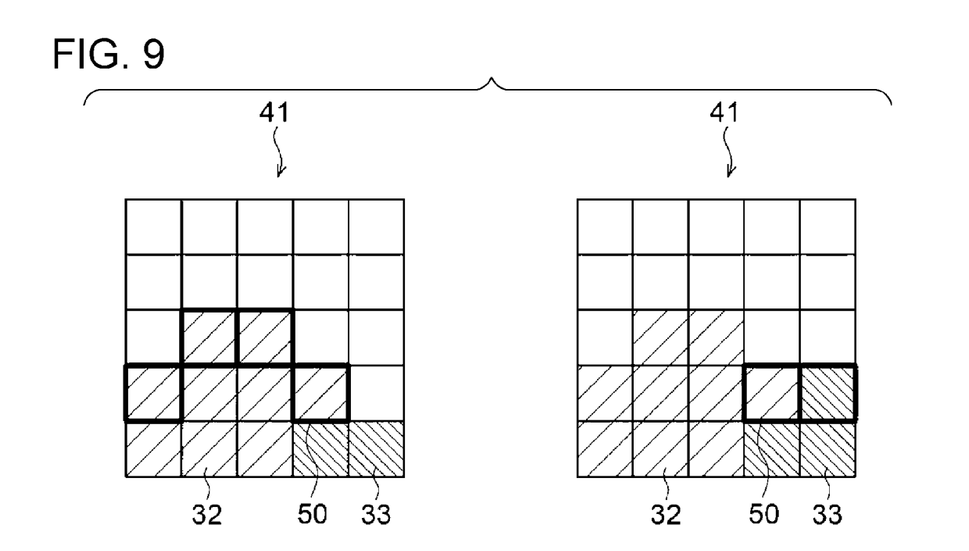
FIG. 9 is a diagram for describing assignment of adjacent regions.

FIG. 9 is a diagram for describing assignment of adjacent regions. Also in FIG. 9, only assignment in the process region 41 illustrated in FIG. 8 will be described. As illustrated in FIG. 9, regarding the adjacent region 32, the adjacent region 32 is assigned to the unassigned pixels having a distance of 1 in the distance image 42 illustrated in FIG. 8 in the difference region 40. Regarding the adjacent region 33, the adjacent region 33 is assigned to the unassigned pixels having a distance of 1 in the distance image 43 illustrated in FIG. 8 in the difference region 40. In FIG. 9, the pixels to which an adjacent region is newly assigned are surrounded by bold lines.

In a case where the pixel position of each pixel included in the process region 41 is represented by a coordinate system (x, y) having the origin at the lower left corner of the process region 41, the distance is 1 at the pixel position (4, 2) (a pixel 50 illustrated in FIGS. 8 and 9) in both the adjacent region 32 and the adjacent region 33. However, in the present disclosure, the adjacent region 32 is assigned first. Thus, when the adjacent region 33 is to be assigned, the adjacent region 32 has already been assigned to the pixel position (4, 2). Thus, when the adjacent region 33 is to be assigned, the adjacent region 33 is not assigned to the pixel position (4, 2) even if the distance is the same as in the adjacent region 32. In this respect, the priority for assigning adjacent regions 32, 33 to the pixel 50 may be set by the user or may be set according to the importance of tissue, organ, or lesion. Alternatively, the distance between the pixel 50 and the barycentric positions of the adjacent regions 32 and 33 may be calculated, and the adjacent region with the smaller distance may be assigned to the pixel 50.

Figure 10:
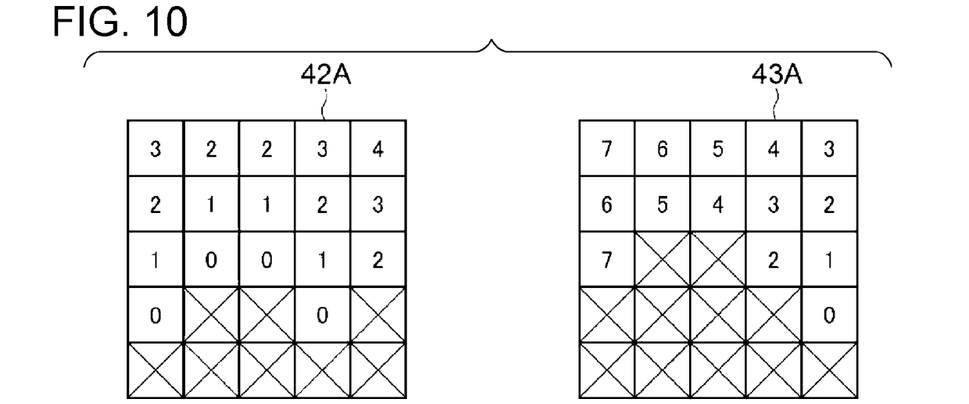
FIG. 10 is a diagram illustrating updated distance images.

If a positive determination is made in step ST14, the assigning unit 26 determines whether there is an unassigned pixel in the difference region 40 (step ST16). If a positive determination is made in step ST16, the assigning unit 26 updates the distance images (step ST17). FIG. 10 is a diagram illustrating updated distance images. FIG. 10 illustrates distance images 42A and 43A of the adjacent regions 32 and 33 for the process region 41 to which the adjacent regions are assigned as illustrated in FIG. 9. After updating the distance images, the assigning unit 26 returns to step ST12, and repeats the process from step ST12. If a negative determination is made in step ST16, the assignment process ends. In a case where the tomographic image displayed on the display screen 30 is changed, a process similar to the above may be performed in the case of correcting a region of interest in the changed tomographic image.

Figure 11:
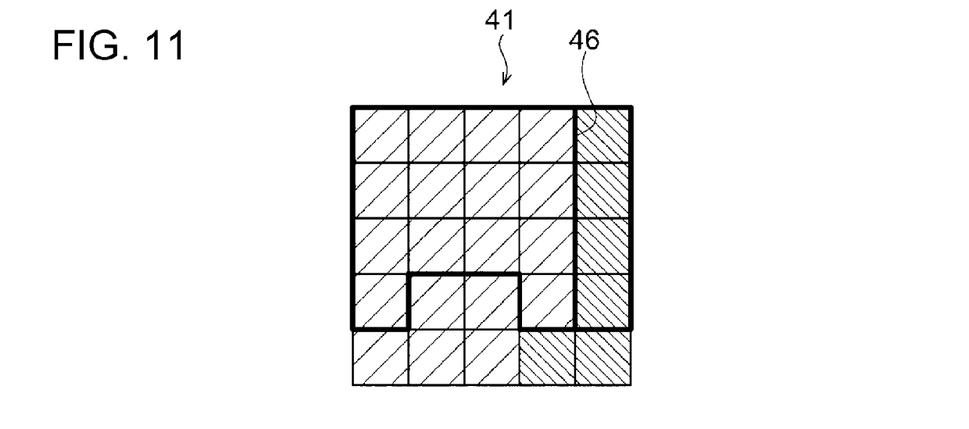
FIG. 11 is a diagram illustrating a process region to which adjacent regions are assigned.

Accordingly, as illustrated in FIG. 11, the adjacent regions 32 and 33 are assigned into the process region 41, and a boundary 46 between the adjacent region 32 and the adjacent region 33 in the process region 41 is defined. Thus, the adjacent regions 32 and 33 are assigned into the difference region 40, and the boundary between the adjacent region 32 and the adjacent region 33 in the difference region 40 is defined.

Referring back to FIG. 4, subsequently to step ST6, the display control unit 23 displays the processed tomographic image in which the adjacent regions are assigned to the difference region on the display 14 (step ST7), and the process ends.

Figure 12:
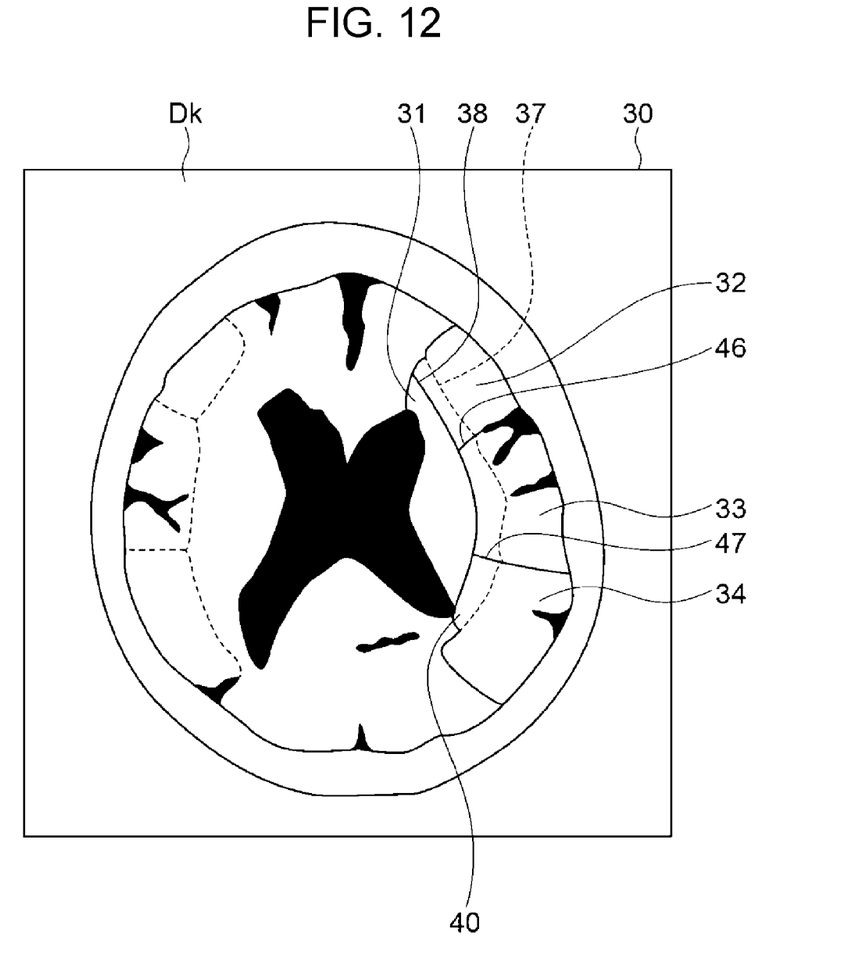
FIG. 12 is a diagram illustrating a display screen including a difference region to which adjacent regions are assigned.

FIG. 12 is a diagram illustrating a display screen of a tomographic image in which adjacent regions are assigned to a difference region. As illustrated in FIG. 12, the boundary between the region of interest 31 and the adjacent regions 32 to 34 has been corrected from the position indicated by a broken line 37 to the position indicated by a solid line 38. In addition, the adjacent regions 32 to 34 are assigned to the difference region 40, and boundaries 46 and 47 between the adjacent regions 32 to 34 in the difference region 40 are set.

As described above, in the present embodiment, in a case where the regions of interest 32 to 34 are adjacent to the region of interest 31, the region of interest 31 is reduced by an instruction to reduce the region of interest 31, and the difference region 40 representing a difference between the region of interest before reduction and the region of interest after reduction is derived. In the difference region 40, the adjacent regions 32 to 34, which are regions of interest adjacent to the region of interest 31, are sequentially expanded on a pixel-by-pixel basis from the boundary between the difference region 40 and the adjacent regions 32 to 34, and thereby the plurality of adjacent regions 32 to 34 are assigned to the difference region 40. Thus, when one of a plurality of regions is corrected to be reduced, the boundaries of a plurality of regions adjacent to the reduced region can be determined.

In the above-described embodiment, the adjacent regions 32 to 34 are assigned by sequentially expanding the adjacent regions 32 to 34 in units of one pixel from the boundary between the difference region 40 and the adjacent regions 32 to 34, but the unit of expansion is not limited to a small region composed of one pixel. The adjacent regions 32 to 34 may be expanded in units of a small region composed of a plurality of pixels, such as 2×2 pixels or 3×3 pixels.

In the above-described embodiment, the process of correcting a region in the tomographic image Dk constituting the three-dimensional image G0 is performed, but the present disclosure is not limited thereto. The process of the present embodiment is applicable to the case of correcting a region by using a certain image, such as a two-dimensional radiographic image, as a target image.

In the above-described embodiment, the region correction device 20 includes the region-of-interest extracting unit 22, but the present disclosure is not limited thereto. A region of interest may be extracted by a separate device connected to the region correction device 20 via the network 4. The three-dimensional image G0 to be acquired may be an image from which a region of interest has already been extracted.

In the above-described embodiment, the technique of the present disclosure is applied to the case of correcting a plurality of regions of interest in a brain, but the target of region correction is not limited to a brain. Any part of a human body, such as a heart, a liver, a lung, or limbs can be a diagnosis target, as well as the brain.

In the above-described embodiment, as the hardware structure of a processing unit that executes various processing operations, such as the information acquiring unit 21, the region-of-interest extracting unit 22, the display control unit 23, the reducing unit 24, the difference region deriving unit 25, and the assigning unit 26, the following various types of processors may be used. The various types of processors include, as described above, a CPU, which is a general-purpose processor that executes software (program) and functions as various processing units; a programmable logic device (PLD), which is a processor whose circuit configuration is changeable after manufacturing, such as a field programmable gate array (FPGA); a dedicated electric circuit, which is a processor having a circuit configuration designed specifically for performing specific processing, such as an application specific integrated circuit (ASIC); and the like.

A single processing unit may be constituted by one of these various types of processors or may be constituted by a combination of two or more processors of the same type or different types (for example, a combination of a plurality of FPGAs, or a combination of a CPU and an FPGA). A plurality of processing units may be constituted by a single processor.

Examples of constituting a plurality of processing units by a single processor are as follows. First, as represented by a computer of a client or server, a single processor is constituted by a combination of one or more CPUs and software, and the processor functions as a plurality of processing units. Secondly, as represented by a system on chip (SoC), a processor in which a single integrated circuit (IC) chip implements the function of an entire system including a plurality of processing units is used. In this way, various types of processing units are constituted by using one or more of the above-described various types of processors as a hardware structure.

Furthermore, as the hardware structure of the various types of processors, more specifically, electric circuitry formed by combining circuit elements such as semiconductor elements may be used.

What is claimed is:

1. A region correction device comprising:
   at least one processor configured to:
   extract an image of a plurality of images, the image comprises a plurality of regions which include a first region, wherein at least two of the plurality of regions are in contact with each other;
   perform a reduction of the first region among the plurality of regions in response to an instruction to reduce the first region, the instruction being provided for a target image in which the plurality of regions are adjacent to each other, the plurality of regions being three or more regions different from each other;
   derive a difference region representing a difference between the first region before the reduction and the first region after the reduction, the difference region being composed of a plurality of small regions; and
   assign a plurality of adjacent regions adjacent to the first region to the difference region by sequentially expanding, in the difference region, the plurality of adjacent regions in units of the small regions from a boundary between the difference region and the plurality of adjacent regions.

2. The region correction device according to claim 1, wherein the processor is configured to repeat expansion of the plurality of adjacent regions until the difference region has no more unassigned regions left.

3. The region correction device according to claim 2, wherein the processor is configured to derive, for unassigned small regions adjacent to assigned small regions to which the plurality of adjacent regions are assigned in the difference region, distances from the assigned small regions for each of the adjacent regions, and sequentially assign the adjacent regions to small regions having a smallest distance for each of the adjacent regions, to expand the adjacent regions.

4. The region correction device according to claim 3, wherein the processor is further configured to extract the plurality of regions from the target image.

5. The region correction device according to claim 2, wherein the processor is further configured to extract the plurality of regions from the target image.

6. The region correction device according to claim 1, wherein the processor is configured to derive, for unassigned small regions adjacent to assigned small regions to which the plurality of adjacent regions are assigned in the difference region, distances from the assigned small regions for each of the adjacent regions, and sequentially assign the adjacent regions to small regions having a smallest distance for each of the adjacent regions, to expand the adjacent regions.

7. The region correction device according to claim 6, wherein the processor is further configured to extract the plurality of regions from the target image.

8. The region correction device according to claim 1, wherein the processor is further configured to extract the plurality of regions from the target image.

9. The region correction device according to claim 1, wherein the processor is further configured to assign the plurality of adjacent regions adjacent to the first region to the difference region according to the predetermined priority set to the plurality of adjacent regions.

10. A region correction method comprising:
    extracting an image of a plurality of images, the image comprises a plurality of regions which include a first region, wherein at least two of the plurality of regions are in contact with each other;
    performing a reduction of the first region among the plurality of regions in response to an instruction to reduce the first region, the instruction being provided for a target image in which the plurality of regions are adjacent to each other, the plurality of regions being three or more regions different from each other;
    deriving a difference region representing a difference between the first region before the reduction and the first region after the reduction, the difference region being composed of a plurality of small regions; and
    assigning a plurality of adjacent regions adjacent to the first region to the difference region by sequentially expanding, in the difference region, the plurality of adjacent regions in units of the small regions from a boundary between the difference region and the plurality of adjacent regions.

11. A non-transitory computer-readable storage medium that stores a region correction program that causes a computer to execute:

extracting an image of a plurality of images, the image comprises a plurality of regions which include a first region, wherein at least two of the plurality of regions are in contact with each other;

performing a reduction of the first region among the plurality of regions in response to an instruction to reduce the first region, the instruction being provided for a target image in which the plurality of regions are adjacent to each other, the plurality of regions being three or more regions different from each other;

deriving a difference region representing a difference between the first region before the reduction and the first region after the reduction, the difference region being composed of a plurality of small regions; and assigning a plurality of adjacent regions adjacent to the first region to the difference region by sequentially expanding, in the difference region, the plurality of adjacent regions in units of the small regions from a boundary between the difference region and the plurality of adjacent regions.

* * * * *